United States Patent [19]

Orr et al.

[11] Patent Number: 4,862,350
[45] Date of Patent: Aug. 29, 1989

[54] ARCHITECTURE FOR A DISTRIBUTIVE MICROPROCESSING SYSTEM

[75] Inventors: Michael A. Orr; Crawford E. Williams, both of Raleigh, N.C.

[73] Assignee: International Business Machines Corp., Armonk, N.Y.

[21] Appl. No.: 42,556

[22] Filed: Apr. 24, 1987

Related U.S. Application Data

[63] Continuation of Ser. No. 637,369, Aug. 3, 1984, abandoned.

[51] Int. Cl.⁴ .................................................. G06F 3/00
[52] U.S. Cl. ................................................... 364/200
[58] Field of Search ............... 364/134, 200 MS File, 364/900 MS File

[56] References Cited

U.S. PATENT DOCUMENTS

| | | |
|---|---|---|
| 3,510,845 | 5/1970 | Couleur et al. ............... 364/200 |
| 4,162,529 | 7/1979 | Suzuki et al. ................. 364/200 |
| 4,204,251 | 5/1980 | Brudevold ..................... 364/200 |
| 4,212,057 | 7/1980 | Devlin et al. .................. 364/200 |
| 4,244,018 | 1/1981 | Mui ............................... 364/200 |
| 4,266,271 | 5/1981 | Chamoff et al. .............. 364/200 |
| 4,286,319 | 8/1981 | Membrino et al. ........... 364/200 |
| 4,320,450 | 3/1982 | Rose .............................. 364/200 |
| 4,325,116 | 4/1982 | Krantz et al. ................. 364/200 |
| 4,417,304 | 11/1983 | Dinwiddie .................... 364/200 |
| 4,466,098 | 8/1984 | Southard ....................... 371/9 |
| 4,527,233 | 7/1985 | Ambrosius .................... 364/200 |
| 4,527,237 | 7/1985 | Frieder et al. ................. 364/200 |
| 4,539,656 | 9/1985 | Abrant .......................... 364/200 |
| 4,541,043 | 9/1985 | Ballegeer et al. ............. 364/200 |
| 4,561,051 | 12/1985 | Rodman et al. ............... 364/200 |
| 4,563,738 | 1/1986 | Klan .............................. 364/200 |
| 4,567,562 | 1/1986 | Fassbender .................... 364/200 |
| 4,622,630 | 11/1986 | Vora et al. ..................... 364/134 |

FOREIGN PATENT DOCUMENTS 0060932 9/1982 European Pat. Off. .

OTHER PUBLICATIONS

*IBM Tech. Disclosure Bulletin*, vol. 23, No. 7B, Dec. 1980, pp. 3295-3296 "Processor System with Tri-State Buffers".
*Digital Integrated Electronics*, by Taub copyright 1977, pp. 428-431.

Primary Examiner—Gary V. Harkcom
Assistant Examiner—Lawrence E. Anderson
Attorney, Agent, or Firm—Joscelyn G. Cockburn

[57] ABSTRACT

An architecture for interconnecting a plurality of remote processors to a primary processor. The architecture provides an improved interface and a communication channel for interconnecting the processors. The interface includes a commonly shared buffer which stores messages to be exchanged between the primary processor and the remote processors. A controller (microprocessor based) is provided to manage the buffer and the communication channel. The controller gives the primary processor direct access to the buffer periodically. Likewise, the controller uses a polling technique to enable each remote processor to communicate, over the communication channel, with the shared buffer.

1 Claim, 3 Drawing Sheets

FIG. 3

| MESSAGE LENGTH | PORT NUMBER | ADD. WAIT PARAMETER | BYTE WAIT PARAMETER | ADDRESS | CONTROL | DATA | | CRC | CRC |

ARCHITECTURE FOR A DISTRIBUTIVE MICROPROCESSING SYSTEM

This is a continuation of co-pending application Serial No. /637369 filed on Aug. 3, 1984, now abandoned.

BACKGROUND OF THE INVENTION

1. Field of the Invention

The invention relates to teleprocessing in general and more particularly to the gathering and transmission of data through a communication channel to a primary processor, of a data processing system, by a plurality of devices which may be remotely located relative to the processor.

2. Prior Art

The rapid development and production of microprocessors have revolutionizedthe way in which multiprocessing systems are configured. Such multiprocessing systems use a plurality of microprocessors for performing the overall data processing functions. Each microprocessor is assigned a dedicated task while at least one of the microprocessors is assigned the task of correlating the results generated from each of the processors.

An electronic point-of-sale terminal is a typical example of a multiprocessing system. In such point of sale terminals a common control processor is assigned the task of processing data received from and to be transmitted to a plurality of terminal devices placed at a plurality of locations. The terminal devices may be remotely located with respect to the control processor. Such terminal devices may include keyboards, alphanumeric displays, operator displays, printers, cash drawers, magnetic card readers, scanners, etc. Each of the devices is provided with a microprocessor which is dedicated to control the device.

Data resulting from transactions carried out at the terminal devices are exchanged between the common control processor and the dedicated device processors. A good many of the transactions require that the data be transmitted and processed on a real time basis. In order to meet the real time requirement, the prior art has adopted several types of system configurations.

One type of prior art system configuration is described in U.S. Pat. No. 4,264,954 Barry D. Briggs et al. The subject patent describes a distributed function communication system wherein information is exchanged between a host computer and a plurality of remote point of sale terminals. One or more master terminals is placed between the host computer and the remote terminals. Information transmitted from the processor is processed and retained at the master terminals and then serially transmitted to the remote terminals. The effect of the master terminal is transparent to the remote terminals.

U.S. Pat. No. 4,223,380 to Antonaccio et al is another example of the prior art multiprocessing configuration. In the subject patent a common interprocessor bus is used to interconnect a plurality of microprocessor modules. The commonly shared bus serves as a communication path for the microprocessor modules. A communication network routine (CNR) unit is placed in each microprocessor module. The function of the CNR unit is to monitor and control the bus. As a result, the microprocessors are free to perform other functions.

Still other configurations for interconnecting microprocessor modules to form a unified multiprocessing system are given in U.S. Pat. Nos. 4,145,739 (Dunning et al); 4,254,464 (Byrne); 4,394,726 (Kohl) and 4,204,251 (Brudevold).

The Dunning et al patent describes a distributed data processing system for processing informational data. The system consists of a resource memory which stores instruction and informational data. A master central processor is programmed to control the memory. A plurality of slave processor controlled devices are connected via serial communication link (coaxial cables) to the master central processor. Access to the resource memory is under control of the master central processor. Requests by slave devices, for access to the disk or requests to have services performed by another slave device, are stored in dedicated storage areas (called semaphores) of the requesting slave devices. The areas are periodically polled and read by the master. Once the master completes the requested services, the master resets the storage area to a value indicating that the requested service has been completed.

The Byrne patent describes the use of a common data buffer for interfacing a plurality of minicomputers with a space vehicle. Each of the minicomputers communicates with the buffer through buffer access cards. A high speed scanner is connected to each of the buffer access cards. The scanner is provided for transferring the information stored in the buffer access card in a predetermined sequence to and from the common data buffer memory.

The Kohl patent describes a multiport memory access architecture for a bus communication network. Devices which are connected to the bus are granted direct memory access (DMA) privilege in a predetermined sequence with selected devices being given access more than once in the sequence. Each device must raise a "request signal" to gain entry into the storage.

Finally, the Brudevold patent describes an interface for interconnecting multiple data processors in a distributed data processing network. The interface is used to transfer data between the processors. In order to use the interface, a processor must generate a message requesting its use.

SUMMARY OF THE INVENTION

It is therefore a general object of the present invention to provide a more efficient distributed function communication system than has heretofore been possible.

It is a more specific object of the present invention to provide a more efficient interface for enabling the exchange of messages between a plurality of transaction processing devices and the primary processor of a multiprocessing system.

A shared memory system is provided to interface a primary processor with a plurality of microprocessor controlled devices. The shared memory system includes a random access memory (RAM) and a dedicated processor for managing the RAM. The dedicated processor is connected through isolation electrical circuitry to the RAM. The primary processor is connected through isolation electrical circuitry to the RAM. A status control interface is disposed between the processors. The interface carries control information which enables the dedicated processor to allow the primary processor to "write" and/or read data from the buffer. The primary or main processor is connected to a non-shared memory space. The non-shared memory space enables the main processor to continue data processing even though it is denied entry into the shared RAM. The arrangement obviates the need to halt the primary processor and as a result system throughput is enhanced.

The dedicated processor includes a serial I/O adapter which is connected through a serial communication channel to the plurality of microprocessor controlled devices. Messages etc. to be exchanged between the primary processor and a microprocessor controlled device are stored in the shared RAM. A list of devices is maintained in the shared RAM. The dedicated processor receives data from the device whose identity is given by a pointer in the shared RAM. By sequentially polling the devices each device is given an opportunity to send data over the serial communication channel into the shared RAM. The data can then be accessed by the primary processor. Messages from the primary processor to a device are placed into the shared RAM by the primary processor. The dedicated processor prepares and transmits these messages immediately upon regaining access to the RAM.

The foregoing and other features and advantages of this invention will be more fully described in the accompanying drawings.

BRIEF DESCRIPTION OF THE DRAWINGS

FIG. 3 is a sketch showing the format of the message which is exchanged between the primary and secondary processors.

DETAILED DESCRIPTION OF THE PREFERRED EMBODIMENT

The present invention is intended for use in any distributive multiprocessing system environment. It works well in a point of sale terminal environment and as such will be described in that environment. However, the fact that the invention is described in a point of sale terminal environment should not be construed as a limitation on the scope of the invention. This environment is chosen because it provides an acceptable environment for describing the invention.

Figure 1:
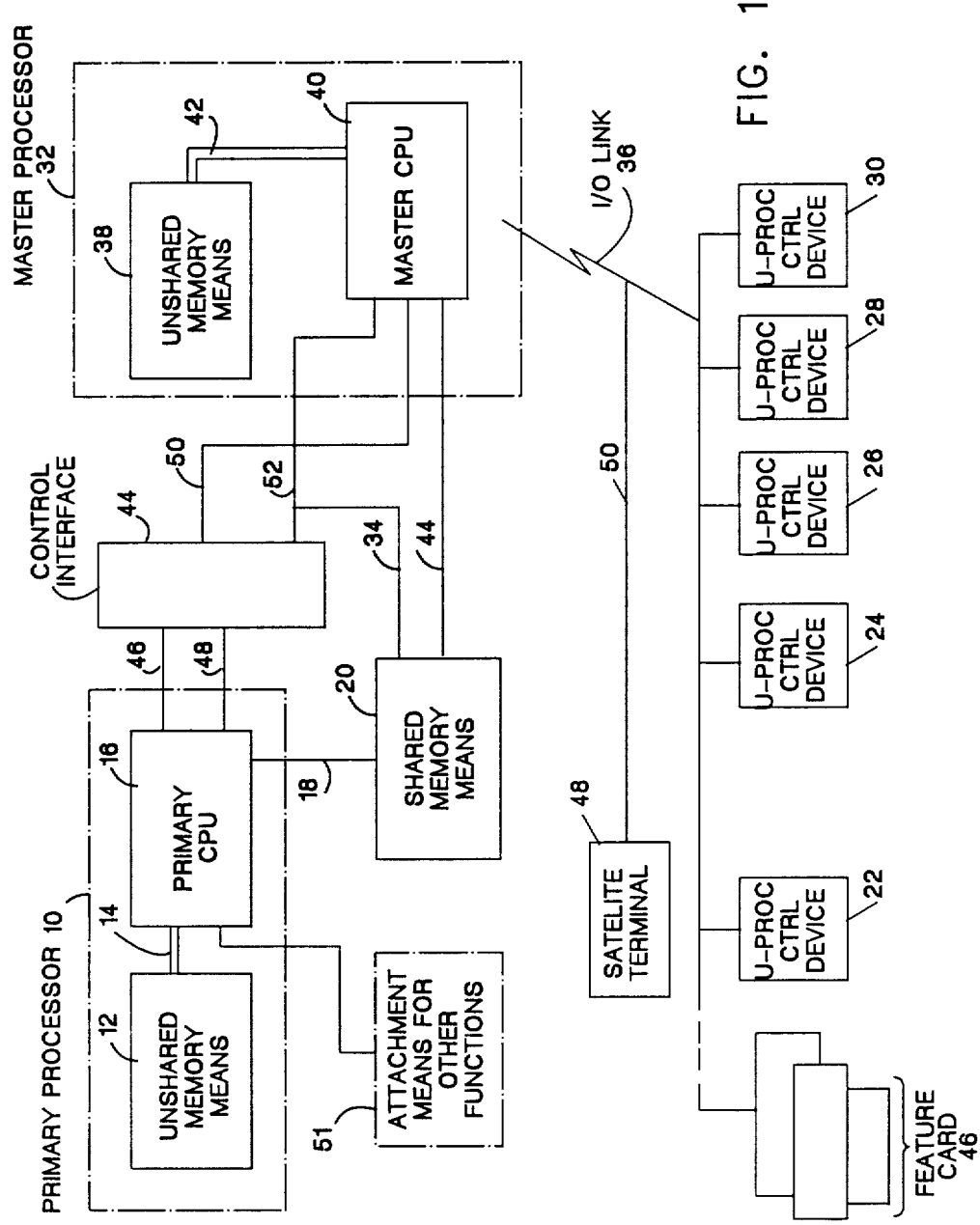
FIG. 1 shows a block diagram for a multi-processing system according to the teaching of the present invention.

FIG. 1 shows a block diagram of a distributive microprocessing system according to the teaching of the present invention. The distributive multiprocessing system includes a primary processor identified by numeral 10. The primary processor further includes an unshared storage means 12 coupled by bus 14 to a primary central processing unit (CPU) 16. Although the memory means and the primary CPU 16 are shown as separate units, this should be construed as demonstrative only since in actuality both the CPU 16 and the memory means 12 are integrated into a common unit. When the configuration in FIG. 1 is used in a point of sale terminal (POST), the primary processor 10 forms the main processing unit of the terminal.

Being the main processing unit in the terminal, the primary processor 10 accepts data collected from input/output units (to be described subsequently). It then processes the data and returns the processed information to identified I/O units. The primary processor also communicates with a higher level processing system (not shown).

Still referring to FIG. 1, memory means 12 is characterized as being unshared because no other processor in the system has access to the memory means. Stated another way, memory means 12 is dedicated to the primary processor. Although the memory means may be a static random access memory (RAM) in the preferred embodiment of this invention, the memory means is a dynamic RAM. The operation of dynamic RAMs is well known in the technology and as such the details will not be given. Suffice it to say that the dynamic RAM is more efficient than a static RAM. The unshared memory means 12 may also include read-only memory (ROM) which is also dedicated for use by the primary CPU 16. In the preferred embodiment of the invention, the primary processor is the 80286 microprocessor manufactured by the Intel Corporation. This is a commercially available processor whose detail is given in the documentation supplied with the processor. Of course, other types of commercially available processors may be used without departing from the scope of the present invention. Conductor 18 connects primary processor 10 to shared memory means 20. Preferably, the shared memory means 20 is fabricated from a static RAM. Details of the shared memory means 20 will be given hereinafter. Suffice it to say at this point that the function of the shared memory means hereinafter referred to as the shared buffer is to store messages, status, commands, and to exchange them between the primary processor 10 and the plurality of remote devices identified by numerals 22–30.

In order to facilitate the exchange of messages, a master processor identified by numeral 32 is coupled by conductor 52 to the shared memory means 20. The function of master processor 32 is to control the shared memory means and to generate serial messages for transmission over I/O serial link 36 to the devices connected in parallel to the serial link. The master processor 32 includes an unshared memory means 38 and master CPU 40. The unshared memory means 38 and the master CPU 40 are interconnected by bus means 42. As with the primary processor, the master CPU 40 is the only engine that may access memory means 38. Also, the unshared memory means 38 need not be a separate module as is shown in the drawing. In actuality, the memory means is integrated on a common module with the master CPU. Because the master processor 32 has to service the I/O link 36, it is necessary that the processor include a serial I/O port. The processor removes information from the shared buffer via conductor 33, serializes it, places it on its serial output port from whence it is transmitted to all of the I/O devices coupled to the link. The device whose address appears in the message will utilize the data. Although any processor that has a serial I/O capability can be used in the preferred embodiment of the invention, the master processor is an Intel 8051 processor. This processor is an off-the-shelf processor fabricated by the Intel Corporation and is available for performing dedicated tasks such as managing the shared buffer and the serial I/O link 36. Of course, it should be noted that other processors can be used without departing from the scope of the present invention.

Still referring to FIG. 1, the shared buffer 20 is external to both the primary processor 10 and the master processor 32. However, the message buffer is under the control of the master processor. In order to allow the primary processor to gain access to the message buffer, periodically the master processor relinquishes its control over the message buffer and thereby enables the primary processor to access the message buffer to deposit a message or to extract a message from said message buffer. In order to facilitate the transfer of the buffer, a control interface 44 is coupled over conductors 46, 48, 50 and 52, respectively, to primary processor 10 and master processor 32. The details of control interface 44 will be given subsequently. Suffice it to say at this point that the function of the control interface 44 is to generate the necessary handshaking signals which are required to pass control of the shared buffer from the master processor 32 to the primary processor 10 and vice versa.

Still referring to FIG. 1, the communication channel which interconnects the plurality of devices to the master processor is a serial I/O link. Of course, other types of communication channels can be used to replace the serial I/O link without departing from the scope or spirit of the present invention. The serial I/O link 36 is fanned out into a multi-point configuration and a plurality of devices identified by numerals 22-30 are connected thereto. In a point of sale terminal environment these devices are transaction oriented and may include printers, scanners, display units, magnetic stripe readers, etc. In the preferred embodiment of this invention the devices are all controlled by individual microprocessors. These microprocessors are dedicated to perform specific tasks and periodically are given the opportunity to report their status or transfer information over the I/O link 36 to the shared buffer. Likewise, information for these devices is deposited in the shared buffer from the primary processor and is subsequently transmitted under the control of master processor 32 to the respective device.

In order to facilitate information transfer between the master processor and the remote devices, a simple protocol is needed to tie them together. A plurality of such simple protocols are known in the prior art and since this invention does not address the idea of protocols for tying the master processor to the remote devices, details of such protocol will not be given.

Still referring to FIG. 1, a plurality of feature cards identified by numeral 46 are connected to the fan-out section of serial I/O link 36. These feature cards act as adapters and can be used for attaching vendor manufacturers' equipment to the terminal. In a point of sale terminal such equipment may be magnetic stripe readers, weighing scales, etc.

In operation, the plurality of remote microprocessor control devices perform specific tasks and transport the information over communication channel 36 to primary processor 10. The primary processor performs some central processing function returning results to a selected remote processor and/or a higher level processor. A message buffer 20 under the control of a master processor 32 is used to facilitate the exchange of messages and data between the remote processors and the primary processor. When the described distributed architecture of the present invention is used in a point of sale terminal, the main terminal includes the primary processor, the shared buffer, the master processor, the plurality of microprocessor control devices 22-30, and the feature cards 46.

In order to expand the processing capability of the terminal, a satellite terminal identified by numeral 48 can be connected via conductor 50 to the serial I/O link 36. Similar to the main terminal the satellite terminal may include a plurality of microprocessor controlled devices, feature cards, etc. The satellite terminal may or may not contain a primary processor. If the satellite terminal does not have a primary processor, the primary processor 10 is used as the processing engine. In such a configuration the satellite terminal 48 appears as a device to the primary processor 10 and its associated master processor 32. Data exchanged between the satellite terminal 48 and the primary processor is effectuated via the shared memory means 20.

It is common practice, in retail establishments or other places, to connect a plurality of terminals (such as the one described above) to a loop communication link which in turn is connected to a master computer. Such connection may be done by attachment means 51 (FIG. 1). The attachment means 51 may include a shared buffer (not shown) with another master processor (not shown) for controlling the buffer and a control interface (not shown) for exchanging control information between the master processor and primary processor 10. In other words, attachment means 51 can be used to gather information for the primary processor to process. Such information may be interconnecting the terminal to a loop or performing a hard total calculation in a point of sale terminal.

Figure 2:
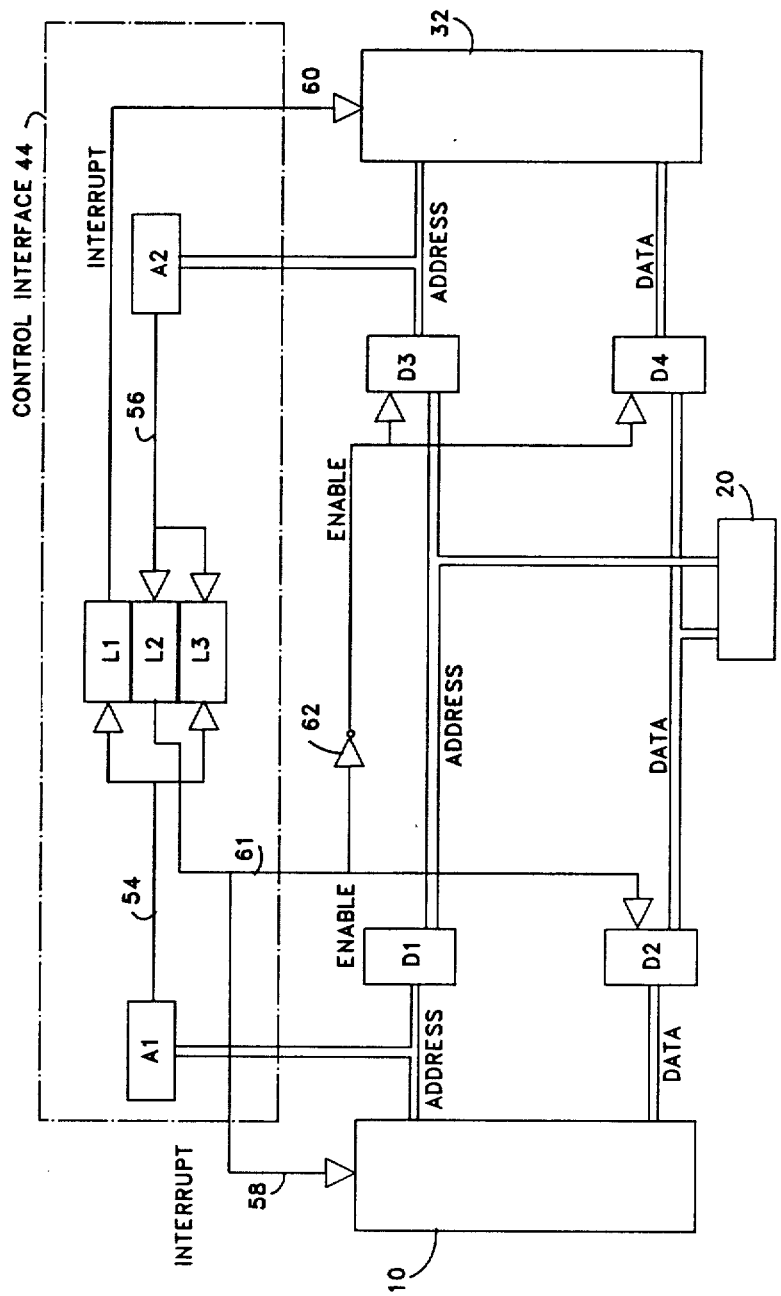
FIG. 2 shows a block diagram of the interface which interconnects the primary processor to the remote processors.

FIG. 2 shows a more detailed block diagram of control interface 44. The interface allows primary processor 10 and the master processor 32 to share message buffer 20. In order to simplify the description elements in FIG. 2 that are common to elements in FIG. 1 are identified by the same numerals. Also, the serial I/O link with its attachment of satellite terminal, feature cards, I/O devices, etc. are omitted. The dedicated memory means (ROM and/or RAM) which are associated with processors 10 and 32, respectively, are not shown as external modules. However, it should be assumed that these memories are integrated in the respective processors and as a result the processors are shown as single blocks. Each of the processors 10 and 32, respectively, includes an address bus and a data bus. The address bus of both processors is coupled to the control interface means 44. The address buses of both processors are coupled through tri-state buffers D1 and D3 to the shared message buffer 20. Likewise, the data buses of both processors are coupled through tri-state buffers D2 and D4 to the shared message buffer 20. Since the address and data buses of both processors are coupled to the shared message buffer, each processor has the ability to address the shared buffer and extract or place information at desired addresses within the buffer.

The tri-state buffers are conventional electrical components. When activated the buffers disable the output from a particular device such as processors 10 and/or 32. Since tri-state buffers are well known in the prior art, details of these buffers will not be given. By intercepting the address and data bus of both processors with tri-state buffers, the shared memory can be electrically isolated from the address and data bus of either processor. As a result, processors 10 and 32 cannot access shared message buffer 20, simultaneously. Of course, if one of the processors has internal capabilities which can be used to render inactive its address and data bus, then one may elect to use the inherent disabling capability of the processor and not use the tri-state buffer. In other words, provision must be made to render one processor incapable of accessing the shared message buffer when it is being used by the other processor. It should be noted that in the multi-processing architecture of the present invention even if access is denied to the primary processor 10 the primary processor has its own dedicated storage and as a result it can continue to process information even when it has no access to the shared memory. This feature of the present invention significantly enhances data throughput.

Still referring to FIG. 2, the handshaking and control for the accessing of the shared memory is done through control interface 44. The control interface 44 includes latches L1, L3 and L2. Latches L1 and L3 are connected by conductor 54 to a combinatorial logic means identified as A1. Combinatorial logic means A1 is tied to the address bus of primary processor 10. Similarly, latches L3 and L2 are tied by conductor 56 to combinatorial logic means A2. Combinatorial logic means A2 is tied to the address bus of master processor 32. An interrupt control line identified by numeral 58 interconnects primary processor 10 to the control interface 44 while an interrupt control line identified by numeral 60 interconnects master processor 32 to control interface 44. As will be explained subsequently, these interrupt lines are activated when either of the processors requires use of the shared message buffer. A control line identified by numeral 61 interconnects the control interface 44 with tri-state buffers D1 and D2, respectively. An inverter circuit identified by numeral 62 interconnects the enable line to tri-state buffer D3. This inverter insures that the electrical state of D1, D2 is opposite to the electrical state of D3, D4. Stated another way, when D1 and D2 are enabled, D3 and D4 are disabled and vice versa.

As stated above, periodically the master processor 32 allows the primary processor 10 to access the shared buffer 20. To effectuate this turnover of buffer the tri-state buffers D1 and D2 are made conductive while tri-state buffers D3 and D4 are made non-conductive (disabled). When the tri-state buffers D1 and D2 are made conductive, the address and data bus of the primary processor are tied into the shared buffer. Likewise, the address and data bus of master processor 32 are blocked from accessing the shared buffer. When the shared buffer under the control of the primary processor, the primary processor believes that the shared buffer 20 is part of its own address space. As a result, the primary processor can write and read information from preassigned memory locations and as a result believes that it is accessing its own memory when in fact it is accessing information in the shared buffer. This technique simplifies the software program and the time needed to transport information between the shared buffer and the dedicated non-shared buffer of the primary processor 10. To highlight this feature, it is hereinafter stated that both the shared buffer and latches L1, L3 and L2 are mapped into the memory or I/O space of the primary processor 10. The particular location where the latches and shared memory are mapped into primary processor 10 will be given subsequently.

In order to develop the handshake signals, latches L1 and L3 are mapped into the memory or I/O space of primary processor 10. Likewise, latches L2 and L3 are mapped into the memory or I/O space of master processor 32. L3 is a status latch and is shared by both primary processor 10 and master processor 32. As will be explained subsequently, when the primary processor completes accessing the shared buffer, latch L3 is set. Likewise, when the master processor takes back control of the shared buffer, the master processor resets latch L3. The mapping of these functions into the respective storage space of the processors is done by the address decode logic means A1 and A2, respectively. The address decode logic means monitors the address bus and depending on the setting of certain preassigned bits the decode logic generates control signals on conductors 54 and 56 to set the respective latches.

As stated above, under normal operating conditions the shared buffer is normally owned by the master processor 32. The latches L1, L2 and L3 have the following function:

L1: This latch is set by primary processor 10 to interrupt master processor 32 requesting use of the shared memory 20.

L2: This latch is set by master processor 32 to interrupt primary processor 10 and indicate that processor 10 has control of the shared memory. This latch also enables the tri-state buffers D1 and D2 and disabled tri-state buffers D3 and D4 via inverter 62.

L3: This latch is a status latch which is set by primary processor 10 to indicate to master processor 32 that primary processor 10 is finished using the shared memory. This latch is reset by master processor 32 to indicate to primary processor 10 that master processor 32 has resumed control of the shared memory.

As pointed out above, the strategy of the present architecture is to allow a non-dedicated buffer to be shared by two processors. There are two reasons why the ownership of the shared buffer would be changed.

Reason 1: Ownership of the buffer would change if primary processor 10 has information for master processor 32.

Reason 2: Master processor 32 has information for primary processor 10.

The signal which is exchanged between the primary and the master processor for these two conditions is given below in the table.

TABLE I

| Primary processor 10 (P1) has information for master processor 32 (P2). | |
|---|---|
| P1 | P2 |
| Sets L1 to interrupt processor 32, and continues running. L1 is set by the result of a decode on data and address bits activated by processor 10. | |
| | Runs interrupt service routine setting L2 to interrupt P1. A 1 as a value of L2 also allows P1 access to the shared memory. P2 continues running. |
| Runs interrupt service routine placing information in shared memory. Resets L1, sets L3 to indicate to P2 that P1 is finished with shared memory. | |
| | Resets L2 regaining control of shared memory and acknowledges |

TABLE I-continued

| | memory control by resetting L3. |
|---|---|
| Master processor 32 (P2) has information for primary processor 10 (P1). | |
| | Sets L2 to interrupt P1. This also allows P1 access to the shared memory. P2 continues running. |
| Runs interrupt service routine, retrieving information from shared memory. Sets L3 to indicate to P2 that P1 is finished with shared memory. | |
| | Resets L2 to regain control of shared memory and acknowledges control by resetting L3. |

In the above table the function which is performed by primary processor 10 is tabulated under the heading "P1." Likewise, the function or signals which are generated by the master processor 32 are tabulated under the symbol "P2."

Having described the hardware which interconnects or interfaces the primary processor with a plurality of remote information gathering devices, the protocol and messages which are used to exchange information between the master processor and its control shared memory means 20 and the primary processor will now be described.

In the preferred embodiment of this invention the message buffer is a 2K×8 static RAM used to pass messages and status commands between the primary processor 10 and the master processor 32. As stated above, in the preferred embodiment of the invention the primary processor is an Intel 80286 processor while the master processor is an Intel 8051 processor. When a message is to be transmitted to an I/O device, the 80286 places the message in the message buffer and the master 8051 sends the message out over the serial I/O link. When a message is received from an I/O device, the master 8051 places the message in the message buffer. The 80286 is then notified that there is a received message in the message buffer which should be moved to the 80286 non-shared memory space.

The message buffer, according to the teaching of the present invention, is divided up into different functional areas. The functional areas of the buffer and their associated 80286 memory addresses are given below in Table II.

TABLE II

| FUNCTIONAL AREA | MEMORY ADDRESS |
|---|---|
| 1. 80286 to 8051 Request Byte | 080000 |
| 2. 80286 to 8051 Function Command Byte | 080001 |
| 3. I/O Timeout Parameters | 080002-080004 |
| 4. 80286 Transmit Message Parameters | 080005-080007 |
| 5. 8051 to 80286 Status Byte | 080008 |
| 6. 80286 Receive Message Pointer | 080009-08000A |
| 7. I/O Device Poll List | 08000B-08010A |
| 8. Error Message Buffer | 08010B-08012A |
| 9. Message Space | 08012B-0807FF |

Each of these functions will now be described. The request byte is an 8-bit word which the 80286 sets to describe the actions the 8051 should take when the 8051 regains control of the shared memory. The function of each of these bits is as follows:

| | |
|---|---|
| BIT 7 | 1 = Run master 8051 diagnostics. Setting this bit does a software POR (Power On Reset) of the master 8051. |
| BIT 6 | 1 = Read the Serial I/O Link Timeout Parameters. |
| BIT 5 | 1 = Read and process the 80286 to 8051 function command byte. |
| BIT 4 | 1 = There is a transmit message(s) in the buffer. The transmit message parameters will be read for the number of messages and an address pointer to the first message. |
| BIT 3 | 1 = The poll list has been changed during the last 80286 access of the message buffer. (8051 will start polling at the top of the list when the buffer is returned). |
| BIT 2 | 1 = Perform a dump of the interal 8051 memory into the shared buffer message space. |
| BIT 1 | 1 = Place the E.C. level of the 8051 microcode into the shared buffer message space. |
| BIT 0 | Not defined |

The function command byte is an 8-bit message which the 80286 sends to the 8051. This byte is updated by the 80286 only when the status of one of the functions and controls needs to be changed. This byte is only read in process by the 8051 when bit 5 of the request byte is set. The bit definition of this message is as follows:

| | |
|---|---|
| BIT 7 | 1 = Turn the serial I/O polling function on. If this bit is set, the master 8051 will start polling the I/O devices listed in polling list area of the shared buffer. |
| BIT 6 | 1 = Turn the serial I/O polling function off. Turning this bit on will stop the master 8051 from generating any polls to the I/O devices. |
| BIT 5 | 1 = Turn the 8051 serial I/O poll timeout recording function on. If this bit is on, the master 8051 will keep track of device poll timeouts in accordance with the I/O timeout parameters. This function cannot be used if the I/O poll list exceeds 64 entries. |
| BIT 4 | 1 = Turn the 8051 serial I/O poll timeout recording function off. If this bit is on, the 8051 will generate an error message to the 80286 every time an I/O device times out in response to a poll. |
| BIT 3 | 1 = Turn the 8051 transmit message CRC generation function on. If this bit is on, the 8051 will generate CRC characters for transmit messages and send them out at the end of the message. |
| BIT 2 | 1 = Turn the 8051 transmit message CRC generation function off. The setting of this bit indicates that the 80286 will be supplying the CRC characters for transmit messages. The master 8051 will not check the CRC of transmitted messages and generate an error message if it detects bad CRC. |
| BIT 1 | 1 = Turn the primary engine card Ram Retention battery on. |
| BIT 0 | 1 = Turn the primary engine card Ram Retention battery off. |

The serial I/O timeout parameters comprises of three bytes located at 80286 memory location 080002-080004. These bytes are read by the master 8051 whenever bit 6 of the request byte is set. The first two bytes are the amount of time the 8051 should wait for a response after transmitting an I/O device poll before it records the device poll timeout. The third byte is the number of consecutive device poll timeouts that can occur for each device when the serial I/O poll timeout recording function is enabled, before an error message is sent to the 80286 by the master 8051.

The transmit message parameters consist of three bytes located at 80286 memory location 080005-080007. These bytes are read by the master 8051 whenever bit 4 of the request byte is set. The first byte tells the 8051 how many transmit messages there are in the buffer. The next two bytes point to the address in the message space where the first byte of the first message entry is located.

The 8051 to 80286 status byte is located at 80286 memory location 080008. This byte is updated by the master 8051 before each interrupt of the 80286. Its function is to give the status of the 8051 to the 80286. This message is 8 bits long and the bit definition is as follows:

| | |
|---|---|
| BIT 7 | 1 = The master 8051 has run diagnostics and is waiting for poll list generation and/or first transmit message. |
| BIT 6 | Not defined |
| BIT 5 | Not defined |
| BIT 4 | 1 = A message for the 80286 is in the message buffer. |
| BIT 3 | 1 = There is an error message from the 8051 to the 80286 in the error message buffer. |
| BIT 2 | 1 = The 8051 internal memory dump requested by the 80286 is in the shared buffer message space. |
| BIT 1 | 1 = The 8051 microcode E.C. level requested by the 80286 is in the shared buffer message space. |
| BIT 0 | Not defined |

The receive message pointer is a 2 byte field located at 80286 memory address 080009-080000A. Its function is to point to the first byte of any message from the master 8051 to the 80286. The pointer should be used whenever bit 4 of the 8051 to 80286 status byte indicates that there is a message for the 80286.

The poll list is a message which is prepared by the 80286 at memory address 08000B to 08010A. It gives a list of the devices which are attached to the system. Each entry in the list is two bytes long. The list is downloaded into the shared buffer and the master 8051 accesses the list sequentially and depending on the address of the device in the list a poll is generated and transmitted to the device. As a result of the poll, the device is given an opportunity to transmit data to the shared buffer.

The message space is a space in the shared buffer where messages are placed to be transmitted or are placed when received by the master 8051. The space is defined in 80286 memory address location 08012B-08007FF. Messages in this space are pointed to by the appropriate transmit/receive message parameters previously described. All messages received by the master 8051 from I/O devices are placed in this area and the appropriate receive message pointer is generated. When the 80286 has messages to transmit, they are placed in this space and the appropriate transmit message parameters generated. If the 80286 has more than one message to transmit, they must be placed in the message space in continuous memory locations.

When messages are placed in the message buffer by the 80286, the master 8051 transmits the message(s) immediately upon regaining control of the buffer. If more than one message has been placed in the buffer, all messages are transmitted before the master 8051 resumes polling the next sequential entry in the poll list. If a transmit error is detected, message transmission is halted immediately and the error is posted to the 80286 by means of an error message. Any messages remaining to be transmitted are aborted.

Having described the messages and protocol which are exchanged between the master 8051 and the 80286, the message format will now be given.

FIG. 3 shows a graphical representation of the message format. The message format includes a message length field, a port number field, an address wait time parameter, a byte wait time parameter field, an address field, a control byte field, a data field and cyclic redundant check (CRC) field. The various data fields are described as follows.

MESSAGE LENGTH: The message length is contained in the first two bytes of the message from the 80286 to the 8051. This length is the total number of bytes contained in the Address, Control, Data and CRC fields. This field is not transmitted by the 8051.

PORT NUMBER: In the preferred embodiment of the invention, the 8051 has the capability of transmitting the message through one of four individually selected communication transceivers. This one byte field indicates to the 8051 which of these four transceivers should be used for transmitting the message. This field is not transmitted by the 8051.

ADDRESS WAIT TIME PARAMETER: In the preferred embodiment of the invention the 8051 uses an asynchronous start/stop form of data transmission. This one byte parameter sets the amount of time that the 8051 should wait between transmitting the first byte of the message, which is the address of the device that the message is for, and the second byte of the message. This field is not transmitted by the 8051.

BYTE WAIT TIME PARAMETER: In the preferred embodiment of the invention the 8051 uses an asynchronous start/stop form of data transmission. This one byte parameter sets the amount of time that the 8051 should wait between transmission of data bytes, excluding the time between the first and second bytes which is set by the Address Wait Time Parameter. This field is not transmitted by the 8051.

ADDRESS:: This is the first byte that is transmitted by the 8051. It is the address of the device that the message is intended for.

CONTROL BYTE: This byte contains the send/receive count information that is sent with the message in order to keep track of messages and the responses to those messages. It is very similar to the method used in the IBM SDLC communications protocol.

DATA: This is the data that is to be transmitted by the 8051 after transmission of the Control Byte.

CRC BYTES: These two bytes are placed at the end of the transmitted message so that the receiving device may check the integrity of the received data. The two bytes contain the value generated by passing the Address, Control, and Data fields through a Cyclic Redundancy Check polynomial. These same fields are run through the polynomial at the receiving device and a check made to see if the values are the same.

The format of messages from the 8051 to the 80286 contain the same fields as described above except that the Address and Byte Wait parameters are not used.

Although a specific message format, protocol, and set of messages are given above for transmitting information between the master processor and the primary processor, this should be construed only as being illustrative since it is well within the skill of the art to generate other types of message formats, messages and protocols without departing from the scope and spirit of the present invention. Moreover, it should be noted that the message format protocol and messages used are tailored to a particular family of microcomputers. However, since the present invention is independent as to the type of microprocessors used, it is the intent that mere substitution of another microprocessor family and/or a different set of messages, protocol, etc. will not render harmless a device which falls within the scope and spirit of the invention.

We claim:

1. In a multiprocessing system having a plurality of secondary device control processors for processing data generated from particular devices and to provide the data to a satellite terminal and a remote primary processor for further processing an improved interface for controlling and transmitting data between the primary processor and the secondary processors, said improved interface comprising:

a common buffer for storing data and for enabling messages to be exchanged between the primary processor and the secondary device control processors, the satellite terminal;

a serial I/O link for transmitting data;

a first set of tri-state buffers connected to the common buffer;

a first microprocessor interconnecting the first set of tri-state buffers and the serial I/O link; said first microprocessor dedicated to managing said common buffer and formatting messages placed in said common buffer for transmission on said serial I/O link and placing messages received on said link into the common buffer;

a primary microprocessor;

a second set of tri-state buffers interconnecting the common buffer and the primary microprocessor such that said primary processor can be isolated from said common buffer;

a first decode logic means connected to the first microprocessor; said first decode logic means responsive to signals outputted from the first microprocessor for generating a first control signal;

a first latch means connected to the first decode means and responsive to the first control signal to generate a first interrupt signal for setting said second set of tri-state buffers in a first state which allows the primary microprocessor to access the common buffer and interrupts the primary microprocessor;

a second decode means connected to the primary microprocessor and responsive to signals outputted from the primary microprocessor to generate a second control signal;

a second latch means connected to the second decode means and responsive to the second control signal to generate a second interrupt signal for interrupting the first microprocessor;

an inverter circuit means connected to the first latch means and responsive to the first interrupt signal to generate a third control signal for setting the first set of tri-state buffers in a second state opposite to the state of the second set of tristate buffers with said second state inhibiting the first microprocessor from accessing the common buffer;

a thrid latch means connected to the second and first decode means;

said third latch means responsive to be set to a first state by electrical signals outputted from said second decode means when the primary microprocessor terminates its use of the common buffer and responsive to be reset to a second state by electrical signals outputted from said first decode means when the first microprocessor resumes control of said common buffer;

whereby messages from said primary processor to said satellite terminal and said secondary device control processors are placed in said common buffer by the primary processor while said first microprocessor is isolated from said common buffer, and said first microprocessor places received messages from said satellite terminal and said secondary device control processors into said common buffer while said primary processor is isolated from said common buffer.

* * * * *